United States Patent [19]

Jaeger

[11] 4,160,048

[45] Jul. 3, 1979

[54] METHOD OF MAKING A COMPOSITE CAST IRON DRYER OR THE LIKE

[75] Inventor: Frederick T. Jaeger, Rosemere, Canada

[73] Assignee: Eutectic Corporation, Flushing, N.Y.

[21] Appl. No.: 909,169

[22] Filed: May 24, 1978

Related U.S. Application Data

[63] Continuation of Ser. No. 752,739, Dec. 21, 1976, abandoned, which is a continuation-in-part of Ser. No. 728,077, Sep. 30, 1976, Pat. No. 4,064,608.

[51] Int. Cl.$^2$ .......... B23P 7/00; B05D 1/08

[52] U.S. Cl. .......... 427/142; 427/184; 427/191; 427/198; 427/292; 427/319; 427/328; 427/367; 427/368; 427/423; 427/425; 427/427

[58] Field of Search .......... 427/34, 142, 184, 190, 427/191, 192, 198, 223, 225, 292, 319, 320, 327, 328, 367, 368, 412, 423, 425, 427; 29/148.4 D, 527.5, 527.4, 527.6; 228/119, 205, 208; 118/47, 315; 239/185

[56] References Cited

U.S. PATENT DOCUMENTS

| | | | |
|---|---|---|---|
| 2,314,902 | 3/1943 | Shepard | 427/292 |
| 2,534,406 | 12/1950 | Bramberry | 427/427 X |
| 2,576,036 | 11/1951 | Ostertag et al. | 165/89 |
| 2,695,248 | 11/1954 | Ornitz et al. | 427/427 X |
| 2,905,512 | 9/1959 | Ballwin | 427/427 X |
| 3,006,782 | 10/1961 | Wheildon | 427/427 X |
| 3,019,014 | 1/1962 | Miksis | 427/425 |
| 3,228,462 | 1/1966 | Smith | 165/89 |
| 3,339,058 | 8/1967 | Todd | 427/327 X |
| 3,369,922 | 2/1968 | Surchek | 427/425 X |
| 3,390,013 | 6/1968 | Rubish | 427/423 X |
| 3,449,176 | 6/1969 | Klass et al. | 427/327 X |
| 3,620,454 | 11/1971 | Broderick et al. | 239/587 X |
| 3,775,241 | 11/1973 | Justus et al. | 34/85 X |
| 3,986,668 | 10/1976 | Huhne et al. | 239/85 X |

*Primary Examiner*—Shrive P. Beck
*Attorney, Agent, or Firm*—Hopgood, Calimafde, Kalil, Blaustein & Lieberman

[57] ABSTRACT

The invention contemplates a method and means for making a dryer or the like roll having a ferrous metal surface provided with a surface coating of a hardfacing alloy, the ferrous metal surface having a thermal conductivity relative to silver taken as 1 cal/cm$^2$/cm/°C./-sec of at least about 0.06 the hardfacing alloy being a hardfacing heat, corrosion and wear resistant iron-group metal-base alloy mechanically and metallurgically bonded to said ferrous metal surface which is preferably made of cast iron, the hardfacing alloy coating having a thickness ranging from about 0.01 to 0.15 inch, the thermal conductivity of said coating being at least 0.05.

13 Claims, 10 Drawing Figures

STEAM IN
STEAM OUT a
b
c
d
e
f
UNDERCUT
THREAD
BOND COAT
CUSHION COAT
HARDFACE SURFACE COAT
GRINDING

METHOD OF MAKING A COMPOSITE CAST IRON DRYER OR THE LIKE

This is a continuation of copending application Ser. No. 752,739, filed Dec. 21, 1976 (now abandoned) which is a continuation-in-part of my copending application Ser. No. 728,077, filed Sept. 30, 1976 now U.S. Pat. No. 4,064,608.

This invention relates to a method and means for making a composite dryer or the like roll comprising a cylindrical ferrous metal surface with a hardfacing alloy mechanically and metallurgically bonded thereto characterized by improved combination of physical and chemical properties, including resistance to heat, corrosion and wear combined with optimum thermal conductivity.

STATE OF THE ART AND THE PROBLEM

Structural elements of industrial equipment subjected in use to heat and/or corrosion, and/or erosion, including normal wear and tear, such as heat exchanger elements, generally require regular maintenance and care in order to keep the equipment in optimum working condition. Such elements are generally made of ferrous metals (e.g., mild and low alloy steel, cast iron, wrought iron, and the like) and include a variety of structural elements. A particular heat exchange element with which the invention is concerned is a Yankee-dryer roll used in paper manufacture.

Heretofore, it had been the practice to replace the worn, or corroded, or eroded dryer roll with a new roll and, depending upon its availability from the manufacturer, it was not uncommon for the replacement to take an inordinate amount of time, which adds to the overall maintenance cost. Moreover, the cost of replacement rolls has steadily increased due to increasing manufacturing costs aggravated by economic inflation.

The conventional Yankee-dryer roll generally comprises a cylindrical ferrous metal shell, preferably a cast iron shell, mounted on journals through the medium of dished heads, the shell and heads together forming a unitary cylindrical drum. The dryer roll which is generally steam heated functions as a heat exchanger in the drying of wet paper web, such as tissue paper. The wet web of paper is delivered to the surface of the steam heated roll by passing the wet sheet around a large pressure roller which presses the sheet against the revolving heated dryer roll, wherein the pressure roller squeezes out fluids and air from the sheet and the sheet thereafter dried as it travels over the surface of the dryer roll.

Examples of dryer rolls are given in U.S. Pat. Nos. 2,576,036, 3,228,462 and 3,775,241.

Dryer rolls may vary in diameter from about 4 to 30 feet in diameter and about 10 or more feet long. The roll requires an accurately contoured surface to assure optimum thermal contact between the roll and the wet web of paper delivered to it. Thermal conductivity of the ferrous metal shell against which the wet paper web is held is important and, therefore, the ferrous metal surface should have optimum thermal conductivity.

Many ferrous metal substrates, such as cast iron, mild steel, wrought iron, carbon steels, low alloys steels, and the like, exhibit good thermal conductivities of substantially over about 0.06 cal/sq.cm/°C./sec and generally over about 0.08 or 0.1 and ranging as high as about 0.2 (wrought iron) which, in many cases, is important where the metal part is in contact with a heat source for a special purpose, such as the steam heated Yankee dryer roll. Cast iron is preferred because of its consistently high thermal conductivity for a ferrous base metal of that type.

When the wet web to be dried is carried on the surface of the dryer roll, the outer surface of the roll is cooled below the temperature of the inner surface of the shell or drum such that a temperature gradient exists. Depending on the uniformity of the surface of the shell, a temperature gradient may also exist along the length of the shell or drum. It is important, therefore, that heat flow be as uniform as possible over the working life of the roll so that uniform and substantially rapid drying is assured.

As is general with moving parts and surfaces, the roll surface is subject to normal wear, tear and corrosion and requires frequent grinding to maintain the contour as accurate as possible for the purpose intended. When wear becomes compounded with use and grinding maintenance, there reaches a time when the roll has to be replaced.

Attempts have been made to rework the worn roll by applying a corrosion resistant alloy coating to the surface thereof which is thereafter ground to substantially uniform thickness to provide the required contour. One attempt has been to prepare the surface to receive the alloy coating and flame spray, the coating using a wire of 410 stainless steel. Thereafter, the applied coating is then accurately ground to the desired contour.

A disadvantage of the foregoing coating is that it does not have a good life due to wear and also does not dry the paper properly due to its inferior thermal conductivity. Low carbon chromium-containing stainless steels have low thermal conductivities of below 0.06 or 0.05 cal/cm$^2$/cm/°C./sec. Moreover, the coating obtained as above with wire spraying was not dense, was porous and exhibited a stratified structure which further degraded the thermal conductivity. Thus, the coating did not provide the desired protection. Consideration was given to well known nickel-base chromium-bearing alloys, but such alloys do not provide heat conductivities of at least about 0.05 cal/cm$^2$/cm/°C./sec for use on dryer rolls.

For example, the alloy known by the trademark "Inconel" (13% to 15% Cr, 6% to 8% Fe and the balance nickel) exhibits a thermal conductivity of about 0.035 at ambient temperature, which is substantially below the heat conductivity of cast iron and low alloy steels. A nickel-base alloy containing 60% Ni, 24% Fe and 16% Cr exhibits a thermal conductivity of 0.032 which is also very low. A cobalt-base alloy containing 25% to 30% Cr, 1.5% to 3.5% Ni, 4.5% to 6.5% Mo, 2% max Fe, 0.2% to 0.35% C and the balance cobalt exhibits a thermal conductivity of about 0.35 at 200° C. An alloy containing 20% to 22.5% Cr, 19% to 21% Ni, 2.5% to 3.5% Mo, 2% to 3% W, 18.5% to 21% Co, 0.75% to 1.25% Nb+Ta, 0.1% to 0.2% N, 0.2% max C and the balance Fe exhibits a thermal conductivity of about 0.035 at 200° C.

On the other hand, substantially pure nickel exhibits a heat conductivity of about 0.22. However, when chromium, for example, 15% or 20%, is added as a solute metal to the solvent or matrix metal nickel, the thermal conductivity of the nickel drops drastically to below 0.05, for example, in the neighborhood of about 0.03 to 0.04 cal/cm$^2$/cm/°C./sec. For example, an alloy of 80% Ni-20% Cr exhibits a thermal conductivity of about 0.032 at 100° C. Cobalt per se exhibits a thermal conductivity of about 0.165 at ambient temperature. However, when chromium is added as a solute metal in amounts of over 10%, the thermal conductivity is drastically reduced.

Thus, when a heat, corrosion and oxidation resistant alloy coating of low thermal conductivity of substantial thickness is applied to a ferrous metal substrate having a heat conductivity of at least about 0.06, the coating adversely affects the thermal conductivity of the composite assembly and, in the case of a Yankee-dryer roll, can adversely affect the drying rate with respect to the drying of a paper web due to a decrease in thermal conductivity.

Hardness is an important attribute of a coating since it relates to wear resistance. Thus, it would be desirable to provide composite ferrous metal dryer drums having hard dense alloy coatings which are corrosion and wear resistant and which are characterized by a thermal conductivity of at least about 0.05 cal/cm$^2$/cm/°C./sec.

OBJECT OF THE INVENTION

An object of the invention is to provide a method and means for making a composite dryer or the like roll having a ferrous metal surface with a thermal conductivity of at least about 0.06 cal/cm$^2$/cm/°C./sec and having metallurgically bonded thereto a heat corrosion and wear resistant alloy comprising an iron-group metal-base alloy.

A specific object is to provide such means and method equally applicable for making or for reconditioning a composite Yankee-dryer roll having a hard, heat, corrosion and wear resistant iron-group metal-base alloy mechanically and metallurgically bonded to the cast iron substrate and having a thermal conductivity of at least about 0.05 cal/cm$^2$/cm/°C./sec.

It is another specific object to meet the above objects with virtual certainty of superior-quality coating at all times.

A general object is to achieve the foregoing objects at substantial economy of expense for materials and labor.

These and other objects will more clearly appear when taken in conjunction with the following disclosure and the appended drawings, wherein.

SUMMARY OF THE INVENTION

Figure 1:
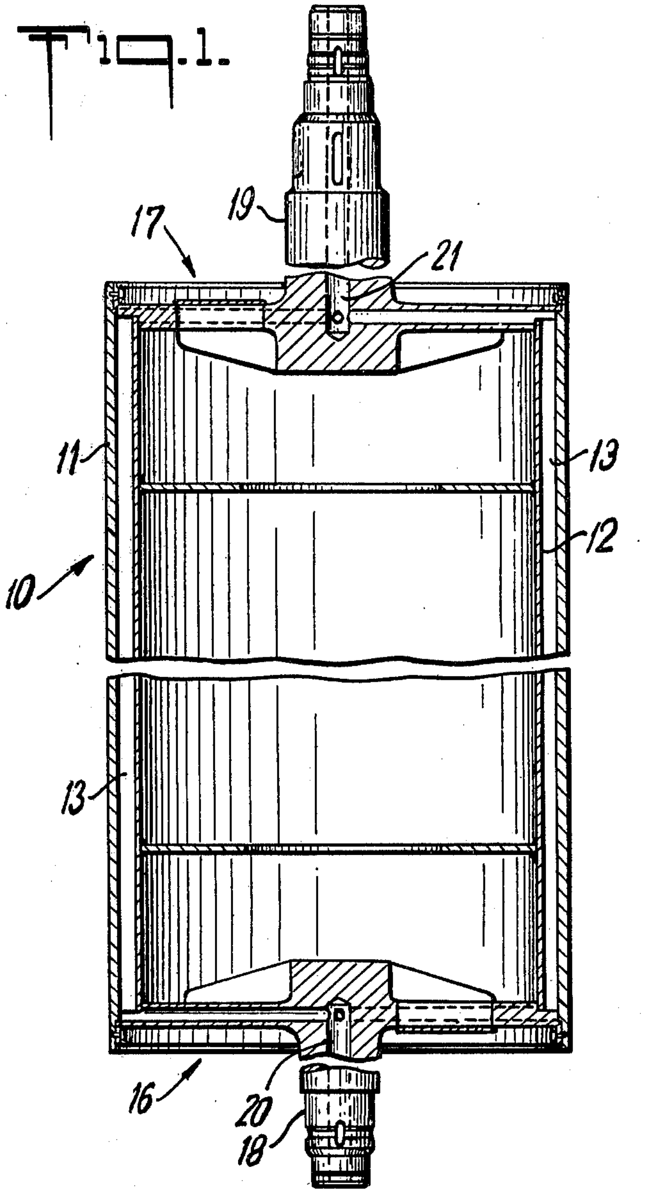
FIG. 1 is representative of a Yankee-dryer roll in longitudinal cross section.

According to the invention, a hard, corrosion and wear resistant alloy coating is provided for application onto a ferrous metal substrate of a dryer roll in which alloying ingredients making up the alloy are judiciously controlled to contain proportions of refractory solute metals, e.g., W, Mo and Cr, etc., which normally substantially adversely affect the heat conductivity of the solvent metal making up substantially the main ingredient of the alloy, that is to say, the base metals Fe, Ni and Co.

It has been found that numerous hardfacing alloys are particularly applicable for carrying out the invention. These alloys are defined as iron-base, nickel-base and cobalt-base alloys (iron-group metals) containing about 0.5% to 5% boron and 0.5% to 6% silicon and up to about 3% carbon in combination with strong carbide and boride formers selected from the group of solute metals mentioned hereinabove, to wit: the refractory metals W and/or Mo and/or Cr. An advantage of the foregoing alloys is that they provide good coatings which are hard and provide optimum resistance to wear. The balance of the alloy is essentially the iron-group metal.

By judiciously controlling the relationship between the refractory solute metals when present, particularly chromium, and the boron and carbon present in the coating alloy, the amount of refractory solute metal going into solution with the solvent metal Fe, Ni or Co can be kept to below that amount that substantially adversely affects the thermal conductivity of the solvent metal, such as nickel. For example, an alloy of 15% Cr, 7% Fe and the balance Ni has a relatively low thermal conductivity (about 0.035) because of the presence of Cr and Fe. By lowering the amount of Cr dissolved in the nickel matrix by converting a substantial portion of the chromium to a carbide or boride so that it is removed from solid solution with the nickel, the thermal conductivity of the alloy can be upgraded to at least about 0.05 and higher and still provide a metal coating characterized by improved resistance to erosion, corrosion, wear and oxidation.

Assuming the alloy is a nickel-base alloy containing by weight 20% Cr and 80% Ni, the addition of about 3% C and 2% B will consume a substantial portion of the chromium in forming the carbide $Cr_3C_2$ and the boride CrB, the solute chromium in the compounds being in equilibrium with the residual chromium in the solvent nickel, taking into account the law of mass action.

What has been said as regards chromium applies equally to the refractory solute metals tungsten and molybdenum. One embodiment of the invention is directed to an alloy coated ferrous metal dryer roll in which the ferrous metal substrate has a heat conductivity relative to silver taken as 1 at substantially ambient temperature of at least about 0.05 cal/cm$^2$/cm/°C./sec, the alloy coating being a heat and corrosion resistant iron-group metal-base alloy mechanically and metallurgically bonded to the ferrous metal substrate and having a thickness ranging from about 0.01 to 0.15 inch, e.g., 0.01 to 0.08 inch thick and preferably 0.04 to 0.08 inch. The coating alloy contains from zero to a total of up to about 30% by weight of at least one strong boride and carbide-forming solute metal selected from the group of refractory metals consisting of W, Mo and Cr, (preferably at least about 5% total), up to about 3% C, about 0.5% to 5% B, about 0.5% to 6% Si and the balance at least about 50% by weight of said iron-group metal (Fe, Ni and Co). The amount of carbon and boron present in said alloy is controlled to be sufficient to combine stoichiometrically with a substantial portion of said refractory metal (e.g., about 70% or more of said metal) such that the alloy coating is characterized by a thermal conductivity at substantially ambient temperature relative to silver taken as 1 of at least about 0.05 $cal/cm^2/cm/°C./sec$.

One embodiment of a Yankee-dryer roll is depicted in FIG. 1 which is described in U.S. Pat No. 3,228,462, the dryer roll comprising a rotatable drum 10 with an outer cylindrical shell 11 of cast iron. A detail description of the dryer need not be given since the sole interest is in the cylindrical surface. The dryer roll has an inner cylindrical shell 12. The inner and outer shells are separated by partitions 13 (note FIG. 2) and intermediate partions 14 radially oriented about and longitudinally disposed relative to the length of the drum. The partitions form passages which are connected by flow diverters 15 (FIG. 2) for circulating heat transfer fluid therethrough.

The outer shell 11, inner shell 12, partitions 13 and 14 are joined to end walls or heads 16 and 17 to provide a unitary structure. The heat exchange fluid supply and return system includes a pair of axially aligned hollow axles 18 and 19 which are integral with dryer heads 16 and 17. The axles have axially extending main supply and return passages 20 and 21 as shown.

Figure 2:
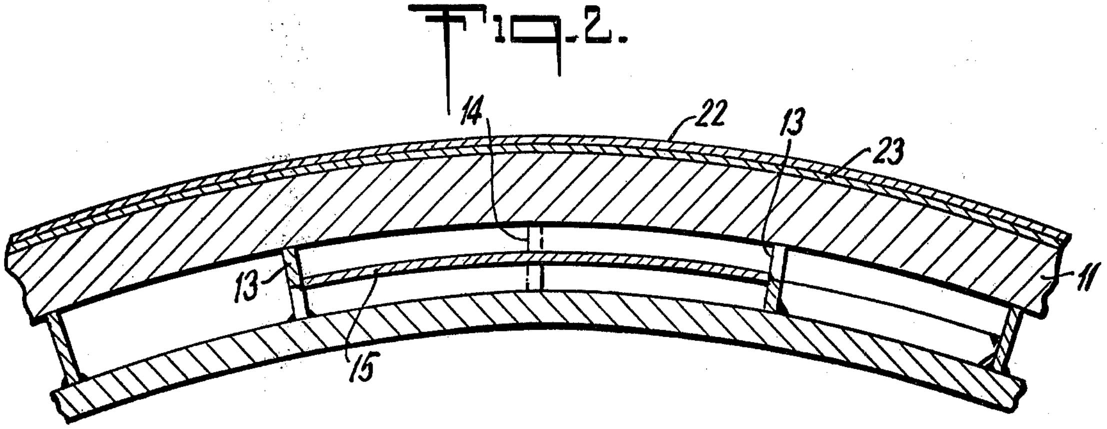
FIG. 2 depicts in partial enlarged section a portion of the cast iron shell of a Yankee-dryer roll showing in transverse cross section an applied alloy coating, the thickness of the coating structure being exaggerated for clarity.

A preferred coating applied to the roll surface is shown in FIG. 2 in which outer cast iron surface 11 has mechanically and metallurgically bonded to it a primary nickel-base alloy coating 22 through an intermediate or cushion coating 23 of a ductile nickel base alloy of thickness substantially less than the primary coating, the primary coating being a hard wear resistant alloy.

The specific primary coating composition employed in coating the Yankee-dryer roll contains by weight 0.2 to 0.4% C, 3% max Fe, 6.5 to 9.5% Cr, 2.5% B, 3% Si and the balance essentially nickel. A preferred intermediate or cushion coating is a nickel-base alloy containing 0.015% max C, 2% max Mn+Si, 7% to 9% Fe, 15% to 16.5% Cr and the balance essentially nickel. A thin layer of the latter coating is employed. The primary coat will have a higher thermal conductivity by virtue of the fact that the boron will combine with substantially all of the chromium in the alloy so that very little chromium remains in solid solution with the nickel matrix.

A preferred cushion alloy is a steel containing at least about 95% iron, the steel being particularly advantageous in that it can be applied to a substantial thickness of about 0.04 to 0.13 inch without degrading to any substantial degree the thermal conductivity, the thermal conductivity generally being over about 0.06 or 0.08 $cal/cm^2/cm/°C./sec$. Example of such a steel is one containing by weight 0.12% C, 1% Mn+Si, 1% Cr, 0.5% Ni, 0.4% Cu and the balance iron. In its broader aspects, the steel may contain up to about 0.5% C, up to about 2% Mn+Si, up to about 2% Cr, up to about 1% Ni, up to about 1% Cu and the balance at least 95% iron.

In contrast to the foregoing, the ductile nickel-base alloy will generally be employed as a cushion layer at thicknesses below 0.04 inch.

Examples of coating alloys which may be employed in carrying out the invention are as follows:

Table I

NICKEL-BASE HARDFACING ALLOYS

| Alloy No. | PERCENT BY WEIGHT Si | B | C | Cr | Mo | W | Ni |
|---|---|---|---|---|---|---|---|
| 1 | 1.5 | 1.5 | — | 5 | 3 | — | balance |
| 2 | 0.5 | 2 | 2 | 15 | — | — | balance |
| 3 | 2 | 1 | 1 | — | 10 | 5 | balance |
| 4 | 2.5 | 1.5 | — | 20 | — | — | balance |
| 5 | 1 | 1 | 3 | — | 5 | 15 | balance |
| 6 | 2 | 2 | 2 | 10 | — | 10 | balance |
| 7 | 1 | 4 | — | 18 | — | — | balance |

Table II

COBALT-BASE HARDFACING ALLOYS

| Alloy No. | PERCENT BY WEIGHT Si | B | C | Cr | Mo | W | Co |
|---|---|---|---|---|---|---|---|
| 8 | 1 | 1 | 2 | 15 | — | — | balance |
| 9 | 0.5 | 2 | 3 | — | — | 15 | balance |
| 10 | 2 | 2 | — | 18 | — | — | balance |
| 11 | 1 | 2 | 2 | 10 | 5 | 5 | balance |
| 12 | 1.5 | 3 | 1 | — | 10 | 8 | balance |
| 13 | 3 | 2 | 0.5 | 12 | 5 | — | balance |

Table III

IRON-BASE HARDFACING ALLOYS

| Alloy No. | PERCENT BY WEIGHT Si | B | C | Cr | Mo | W | Fe |
|---|---|---|---|---|---|---|---|
| 14 | 1 | 1 | 2 | 15 | — | — | balance |
| 15 | 3 | 2 | — | 10 | 5 | — | balance |
| 16 | 2 | 2 | 1 | — | 15 | — | balance |
| 17 | 1 | 3 | 1 | 10 | — | 10 | balance |
| 18 | 2 | 2 | 1 | 20 | 5 | — | balance |
| 19 | 0.5 | 2.5 | — | — | 5 | 10 | balance |
| 20 | 1.5 | 1.5 | 2 | 10 | — | 10 | balance |

The foregoing nickel-base hardfacing alloys of Table I may range in composition from about 0.5 to 3% Si, about 1% to 5% B, 0 to 3% C, about 5% to 25% Cr, 0 to 15% Mo, 0 to 15% W and the balance essentially nickel.

The cobalt-base hardfacing alloys of Table II may range in composition from about 0.5 to 3.5% Si, about 1% to 3% B, 0 to 3% C, about 5% to 30% Cr, 0 to 15% Mo, 0 to 15% W and the balance essentially cobalt.

The iron-base hardfacing alloys of Table III may range in composition from about 0.5 to 3% Si, about 1% to 3% B, 0 to 3% C, about 5% to 25% Cr, 0 to 15% Mo 0 to 15% W and the balance essentially iron.

Stating it broadly, the hardfacing alloy comprises about 0.5 to 6% Si, about 0.5 to 5% B, up to 3% carbon and the balance essentially an iron-group metal from the group consisting of Fe, Ni and Co. In the case of the iron-base alloy, amounts of nickel and/or cobalt may be present, so long as the amounts do not decrease the thermal conductivity of the iron-base hardfacing alloy to substantially below 0.05. Similarly, the nickel-base hardfacing alloy may contain amounts of iron and/or cobalt, and cobalt-base hardfacing alloys may contain amounts of iron and/or nickel with substantially the same restrictions as to the thermal conductivity of the alloy.

Referring to the nickel-base hardfacing alloys in Table I, reference is made to Alloy No. 2 which contains 2% B, 2% C and 15% Cr. As chromium forms borides and carbides, a substantial portion of the solute metal chromium will be removed from solution with the nickel matrix after the coating is applied and fused in place to the ferrous metal substrate. As will be appreciated, the law of mass action will effect a redistribution of the chromium between the matrix and the boride and/or carbide reaction products, with the bulk of the chromium in the nickel matrix being reduced to substantially below 10% by weight, e.g., to 5% or below, thereby upgrading the thermal conductivity of the alloy coating relative to the ferrous metal substrate.

The boron and/or carbon are proportioned in the composition so that about 70% or more of the solute metal is combined as a compound and removed or kept from going into solid solution with the matrix alloy, the amount of solute in the matrix being substantially less than 10%.

Certain metal carbides and borides exhibit good thermal conductivities of at least about 0.05. Thus, in some instances, a two-fold effect may be obtained: (1) upgrading the thermal conductivity of the matrix alloys and (2) providing a refractory metal compound which itself may have the desired thermal conductivity.

In producing a mechanically and metallurgically bonded alloy coating on a ferrous metal dryer roll, the substrate is cleaned in the usual manner. The substrate surface may be further prepared by grit blasting in which coarse plus 25 mesh chilled cast iron grit is employed, or the roll may be machine threaded to enhance further the bonding.

The casting alloys are formulated to provide melting points ranging up to about 2500° F. (1371° C.), the melting points ranging from about 1800° F. (983° C.) to 2250° F. (1233° C.). The melting point is controlled by the amount of silicon and boron in the alloy. The coating is applied by flame spraying an alloy powder of the composition (e.g., atomized powder). The alloy powder particle can be of a mesh size ranging from less than 125 mesh (minus 125 microns) to about 400 mesh size (about 40 microns). Mesh size referred to herein is based on U.S. Standard.

The coating is produced upon the surface of the dryer roll by flame spraying utilizing a flame spray torch of the gravity feed type disclosed in U.S. Pat. No. 3,620,454. Another type of spray torch which may be employed is that disclosed in copending U.S. application Ser. No. 643,823, filed Dec. 23, 1975.

Tests conducted on coatings of over 0.01 inch have shown a marked increase in life compared to unprotected substrates. Large savings in downtime and maintenance costs can be realized. As stated herein, the coating thickness may range from about 0.01 to 0.15 inch thick, such as 0.04 to 0.08 inch.

A preferred method of applying an alloy coating to a ferrous metal substrate is to employ a bond coat which is also applied by metal spraying, preferably using a gravity feed torch of the type disclosed in U.S. Pat. No. 3.620,454 referred to hereinabove. The bond coat may range in thickness from about 0.002 to about 0.01 inch.

The bond coat powder is one in which each particle is an agglomerate of nickel and aluminum particles comprising 3 to 15% by weight of aluminum and the balance essentially nickel. The amount of binding resin may range from about 1% to 5% by weight of the total mixture. The agglomerates are produced using a fugitive binding agent, e.g., a decomposable organic binding agent, such as a phenolic or other similar resin. Such resins adhesively bond the ingredients together.

The average size of the agglomerate ranges from about minus 100 mesh to plus 325 mesh and, more preferably, from about minus 140 mesh to 325 mesh. In spraying the bond coat powder onto the prepared metal substrate, the aluminum in the agglomerate oxidizes in the flame to provide exothermic heat of oxidation which raises the temperature of the flame and provides a means of producing an adherent bond coat on the metal substrate to which the final coating strongly adheres.

DESCRIPTION OF THE COATING MACHINE

Apparatus for providing the indicated coatings on the Yankee-dryer roll 10 is shown in FIGS. 7 to 10. The axle ends of roll 10 are rotatably mounted in head and tailstock pedestals 25–26 fixed with respect to a lathe bed or frame 27 which extends at least between the pedestals. Work-rotating drive means including a motor 28 (see FIG. 10) is contained within pedestal 25, for imparting continuous rotation to a chuck 29 which is clamped to the nearby axle end. Steam-manifolding couplings 30–31 at the respective axle ends include non-rotated pipe connections 32–33 for passing a continuous flow of steam through roll 10. Reducing-valve and other steam-flow control means (not shown) will be understood to be set for bringing the roll-surface temperature up to a prescribed minimum temperature which is held to a substantially uniform level throughout the coating operation; for the roll materials and coating materials with which I have been concerned, I find it desirable to adjust steam pressure and flow such that roll-surface temperature is in the range 200° F. to 220° F., although local surface temperatures will be transiently higher by reason of the coating process, to be later explained.

Figures 7, 8, 9:
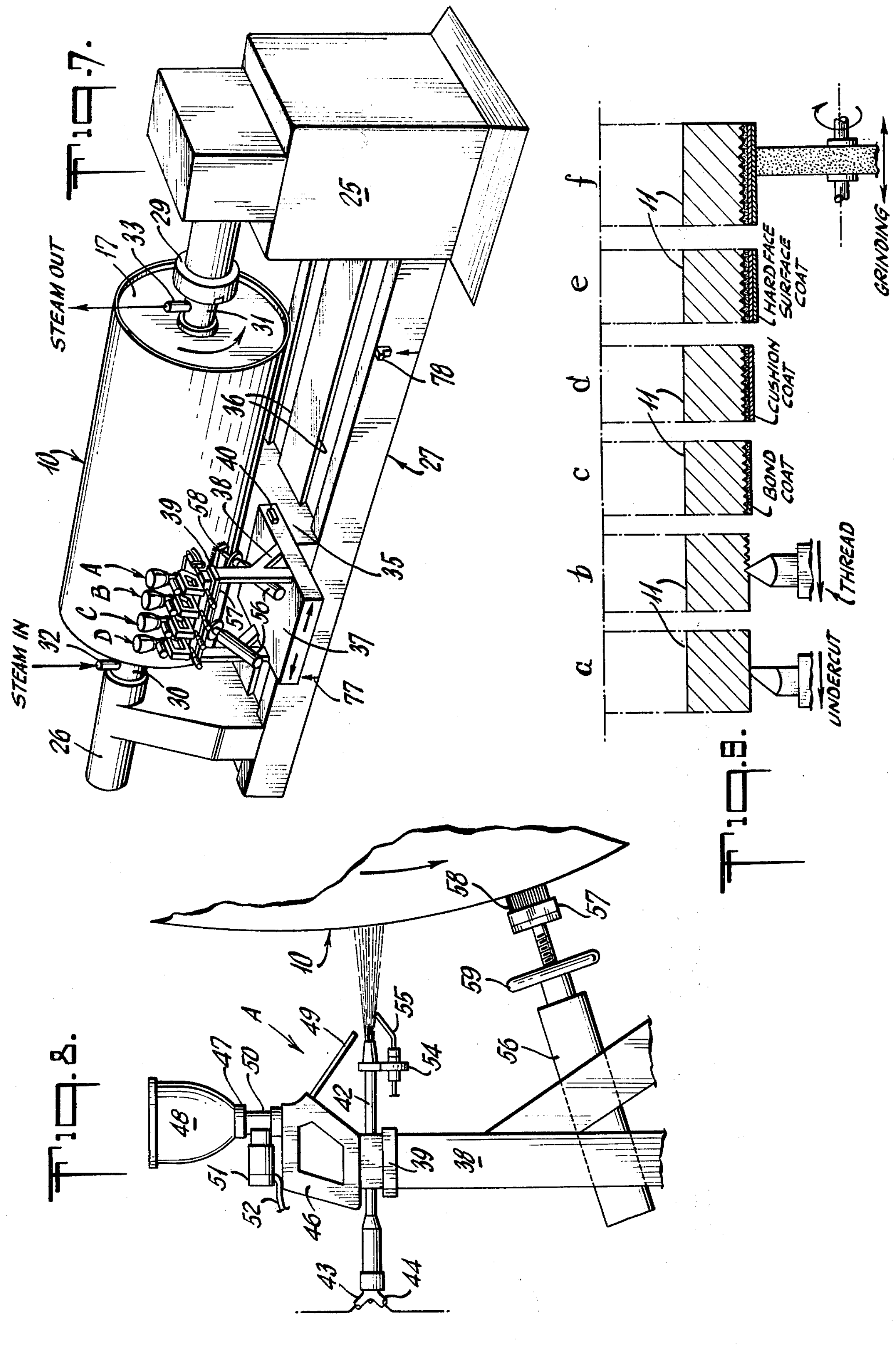
FIG. 7 is a perspective view of apparatus of the invention.
FIG. 8 is an enlarged fragmentary view in end elevation of a portion of the machine of FIG. 7.
FIG. 9 is a series of six related enlarged fragmentary sectional views of the cylindrical outer wall of a Yankee-dryer roll, to illustrate steps of the inventive method.

The lathe of FIG. 7 includes a main slide 35, guided in longitudinal ways 36 in the bed 27. A platform extension 37 is secured to slide 35 and affords a well-guided rugged base upon which to mount upstanding frames 38 and a horizontal beam 39 for mounting the coating apparatus. Lead-screw mechanism (not shown) will be understood to precisely drive the slide 35 along the ways 36, subject to speed selection within pedestal 25 in its drive pick-off connection to motor 28. Means including a limit switch 40 carried by slide 35 is poised to intercept a frame abutment, such as pedestal 25, at one limit of traverse, for establishing reversal of the traverse drive; such means appears in FIG. 10 at LS-1 (switch 40) for one limit of traverse, and at LS-2 for the other limit of traverse, and both switches are operative upon reversible traverse-drive control means 41 to determine recycled forward and reverse traverses in relation to the workpiece, dryer roll 10. Such shuttling traverse motion is suggested by opposed arrows on platform 37 in FIG. 7.

The spraying of the work surface is effected through concurrent operation of a plurality of like gas torches A—B—C—D, mounted in longitudinally spaced array upon supporting beam 39 of the main-slide superstructure 38. Such torches will be recognized as of the gravity-feed type disclosed in said U.S. Pat. No. 3,620,454, although other torch varieties may be employed. Specifically, each torch, such as the torch A shown in greater detail in FIG. 8, comprises an elongate tubular body 42 supplied at its rear end by separate lines 43–44 of acetylene and oxygen gas flow, and terminating with a nozzle at its forward end; nozzle 45 is radially spaced from the work surface and is directed generally horizontally and radially and at that side of the work surface which is downward-moving, as suggested by an arrow applied to roll 10. Torch A further includes its own upstanding frame structure 46 for support of a base 47 to receive a powder-supply vessel 48; a discharge tube 49 carried by frame 46 directs powder from vessel 48 to the flaming gas discharge of nozzle 45, and a valve 50 interposed between vessel 48 and tube 49 is air-pressure operated by means 51, having a line connection 52 to solenoid-operated valve means 53 which forms part of the control circuitry of FIG. 10. To complete the torch structure, a bracket 54 near the nozzle 50 serves to position an igniter electrode 55 for arcing to the nozzle, in starting and restarting the torch.

As a feature of the invention, provision is made for abrasive scouring of the sprayed region of the roll surface immediately following the spray operation. To this end, the superstructure 38 additionally mounts radially directed jacks 56, for adjustably positioning an elongate bar or frame member 57 for stiff wire-brush elements 58, preferably of stainless-steel wire. Bar 57 is mounted below the torch-spray region and is of longitudinal extent encompassing the effective coverage of all torches A-B-C-D, to the end that substantially no sprayed metal powder shall be allowed to remain on the surface of roll 10 unless it has become densely compacted and fused to its substrate. Jack-screw adjustment by wheel-nut means 59 assures strong scouring action for this purpose, and it will be understood that suitable deflector shields (not shown) may be provided to catch, deflect and collect all particles removed by brush means 58, thus avoiding contamination of other mechanism, such as the ways 36.

Figure 10:
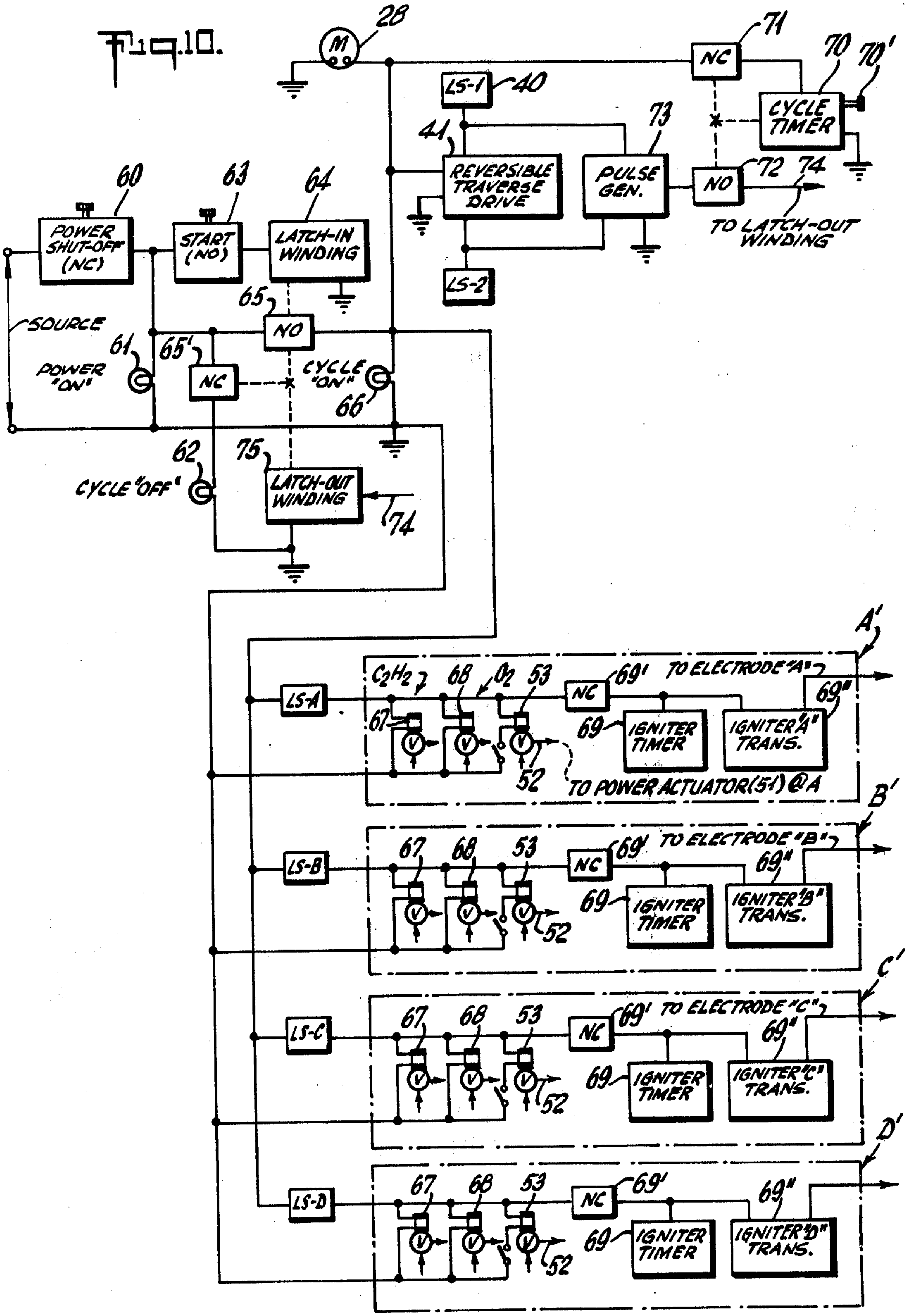
FIG. 10 is an electrical diagram schematically indicating controls for the apparatus of FIG. 7.

FIG. 10 provides additional detail for coordinated semiautomatic operation of the described machine, and for simplification all electrical return lines have been shown or may be assumed to be grounded. A power shut-off button 60 has normally closed contacts, and therefore circuit connection to a source (indicated by legend) will immediately illuminate (a) a lamp 61, signifying "power on" to the machine, and (b) a lamp 62, signifying "cycle-off," meaning that no cycle is in progress. A push button 63 is pressed to close its normally open contacts to supply momentary excitation to a "latch-in" winding 64 having normally open contacts 65 which are thus closed to latch (e.g., magnetically retain) power to the automatic cycle-control system; normally closed contacts 65′ to lamp 62 are also operated by winding 64. Thus connected (upon closure of contacts 65 and opening of contacts 65′), a "cycle-on" lamp 66 illuminates, the "cycle-off" lamp 62 extinguishes, and several parallel circuits are also simultaneously established, namely:

1. Starting of work-rotation motor 28.
2. Starting of the reversible traverse drive 41.
3. Solenoid actuation of valve means 67 to open position, governing admission of acetylene-gas supply to the (acetylene) torch connection 43 for each of the torches A-B-C-D; this operation is in multiple, for each of the several torches, involving corresponding sets of components which, for clarity are enclosed in separate large phantom box outlines A′-B′-C′-D′, as applicable to the several torches. Also, as will be explained below, individual torch operations are subject to a traverse-positional limitation, governed by limit switches LS-A, LS-B, LS-C, and LS-D, as the case may be, all of these limit switches being carried beneath the cantilevered part of platform 37, and at spacings corresponding to those of torches A-B-C-D.
4. Solenoid actuation of valve means 68 to open position, governing admission of oxygen-gas supply to the (oxygen) torch connection 44 for each of the torches A-B-C-D; this operation is also subject to the limitation noted above, in connection with switches LS-A, LS-B, LS-C, and LS-D.
5. Start of the metal-powder flow to the flaming-gas torch discharge, by reason of solenoid-valve (53) operation, to open the associated powder-flow valve 50; this operation is also subject to the limitation noted above, in connection with switches LS-A, LS-B, LS-C, and LS-D.
6. Start of an igniter timer 69 via its normally closed contacts 69′ to govern a period of electrode (55) sparking to nozzle 54; concurrent with this ignition-timer operation, the secondary of an associated igniter transformer 69″ is caused to excite its associated electrode 55. A short period, in the order of ten seconds, is more than ample for ignition time at 69, the same being disconnected at 69′ upon lapse of the ignition-time interval. These ignition operations are noted also to be subject to the limitation noted above, in connection with switches LS-A, LS-B, LS-C, and LS-D.
7. Start of a cycle timer 70, predetermined by adjustment at 70′; it is noted that timer 70 is provided with normally closed contacts 71 through which timer 70 is run, and with normally open contacts 72 which close upon completion of the timed cycle. Nothing necessarily happens upon closure of contacts 72, except that upon completion of the then-current traverse, one or the other of limit switches LS-1 and LS-2 will be operated to signify end of the traverse, and means 73 will be operated to generate an electrical pulse signal which, via the now-closed contacts 72, is operative via connection 74 to a "latch-out" winding 75 to return contacts 65 and 65′ to their "normal" N.O. and N.C. states, thus shutting down the automatic operation.

The above-indicated control operations of the cycle timed at 70 will be understood to develop at least a full single traverse, or a plurality of full traverses of the dryer-roll surface, depending upon the selection made at 70′. A full traverse commences where traverse was last shut down, i.e., at one of the longitudinal ends of ways 36, with slide 35 in only beginning overlap with the adjacent end of the dryer roll 10. Thus, for example, at start of a first left-to-right traverse, the instantaneous axial overlap of slide 35 with roll 10 is such as to place the axis of the right-most torch A substantially in register with the end plane of the cylindrical surface to be coated. In this position, the torch-A associated limit switch LS-A will be understood to be in its normally closed position, thus enabling the above-described A′ operations to proceed; also in this position, torches B-C-D will be beyond the axial end of the dryer roll, and a frame-based trip (not shown at the left end, but suggested by arrow 77 and analogous to a frame-based trip 78 at the right-end plane of dryer roll 10) will be understood to have caused associated limit switches LS-B, LS-C, and LS-D to assume their actuated-open states, thus precluding torch operations at B, C or D beyond the end of the dryer roll. As traverse proceeds to the point where discharge alignment of the second torch B begins to intersect the dryer roll, the limit switch LS-B will be actuated by the left-end trip at 77, thus initiating torch-B ignition and metal-powder flow. Further progress of the same continuous traverse causes limit switches LS-C and LS-D successively to encounter the left-end trip at 77, bringing their associated torches C and D into correspondingly timed discharge upon the cylindrical dryer surface. Once all torches are in operation, continued traverse will be seen to establish effectively four applied coatings for one traversing pass of the work-piece (roll 10) surface.

Upon the first of the torch limit switches encountering the right-end limiting plane of the dryer roll, viz. LS-A for torch A, trip 78 is operative to shut down gas-supply and powder-flow solenoid valves 67-68-53 for torch A, while the same traverse continues with flame-spraying of metal powder at the remaining torches B-C-D. When the limit switch LS-B is actuated by trip 78, torch B will be similarly shut down; and torch C will also be later shut down as its limit switch LS-C is caused (by trip 78) to open its contacts. Torch D remains in operation until the reversing limit switch 40 (LS-1) encounters its traverse-ending abutment, whereupon the traverse is either reversed, or traversing is shut down (along with the other described operations), depending upon the cycle-timing selection made at 70'.

The described machine is seen to operate automatically for any given coat to be applied. Thus, for an initial or bond-coat operation, a relatively short timing may be selected at 70', and the powder-supply vessels 48 loaded with a first desired powder formulation; the machine shuts itself down, at end of a traverse, upon completion of this bond coat. For the next or cushion-coat operation, a relatively long timing may be selected at 70', for greater coat-building, and the powder-supply vessels 48 loaded with a second cushion-coat powder formulation; again, automatic operation of the machine proceeds, for plural traverses, shutting itself down at end of a traverse, upon completion of the cushion coat. Further coats may similarly proceed as called for, the hard-surface coating being then preferred as the final coat, with timing preselected at 70', and with shut down at end of a traverse.

In certain situations, it may not be desirable to spray metal powder at all torches A-B-C-D at the same time. Thus, in the illustrative example below, sufficient bond-coat metal will have been delivered in the course of a single traverse by two (rather than all four) of the torches, yet torches not used for metal spray may nevertheless serve well, in conjunction with brush means 58, to condition the working surface immediately in advance of bond-coat application. Specifically, by opening a switch 53' in the metal-spray solenoid control line for torches A and B, while leaving the switch 53' closed in the control-circuitry C'-D' for torches C and D, the above-described left-to-right single traverse operation will involve two stages of pure-flame (i.e., no metal spray) discharge (via torches A and B) upon and brush-scouring of the working surface before the third (C) and fourth (D) torches are able to spray metal powder for the bond coat, at which time steam-flow heat and torch-A and torch-B heat will have developed preheat and cleaning for utmost work-surface receptivity to the bond coat.

Still further, it will be understood that, if desired, as for greatest protection to the bond-coat surface, the torch-A and torch-B powder vessels 48 may be stocked with bond-coat powder, while the torch-C and torch-D powder vessels 48 are stocked with cushion-coat or hard-surface powder. In this circumstance, the described semi-automatic left-to-right traverse will apply the bond coat immediately prior to the initial layers of the outer coat, at such an immediacy after bond-coat application as to fully cover the otherwise-exposed bond-coat surface, thus permanently sealing and protecting the same against degradation.

ILLUSTRATIVE OF EXAMPLE I

A cast iron paper dryer roll 10 about 5 feet in diameter and 14 feet long was prepared for a build-up coating. The roll was set up in a lathe (as in FIG. 7), and cleaned in the conventional manner. The surface was thereafter prepared for threading, by making a shallow undercut turning operation at constant radius along the length of the roll, as suggested at diagram a of FIG. 9, whereupon a 90° V-thread was cut into the surface using a tungsten carbide cutting tool, as suggested by diagram b of FIG. 9. The roll was driven at about 10 RPM, with the traverse speed of the cutting tool set at 0.45 inch per minute, the thread advance being 22 threads per inch and at a depth of cut 0.023 inch. The use of threads is found to enhance the bond of the overlayer to the drum surface.

Steam was passed via connections 32–33 through the interior of the roll to provide a surface temperature of the order of about 200° F. to 210° F. The torches A-B-C-D were mounted at 14 inch spacings. A bond coat was applied to the surface by spraying a Ni-Al agglomerate powder* containing about 4.5 to 5.5% Al, about 0.75% $CrO_3$ and the balance essentially nickel, this powder being applied to the third and fourth torches (C and D) only, while torches A and B were used solely for their described preheating function. The work was driven at 6 RPM, with traverse feed along the roll at about 1 inch per minute. The aluminum in the spray powder oxidized exothermically in the flame to provide a strongly adherent bond coat of thickness of about 0.005 inch of substantially all nickel which has a high thermal conductivity of over 0.1 at ambient temperature. The bond coat, being very thin, is difficult to show in the drawings, but the partially filled thread grooves in diagram c of FIG. 9 are suggestive.

* The specific powder being a commercially available product known as "XUPERBOND," a trademark of Eutectic Corporation, Flushing, N.Y..

Following the application of the bond coat, an intermediate ductile cushion alloy coating of 0.035 inch thick was optionally applied via all four torches, and over the course of four traverses at about 1 inch per minute, to enhance the resistance of the hard primary alloy coat to contraction and expansion relative to the ferrous metal (cast iron) substrate, the cushion alloy containing 0.015% max C, 2% max Mn+Si, 7 to 9% Fe, 15 to 16.5% Cr and the balance essentially nickel*. Alternatively, the cushion coating alloy may be a steel containing at least about 95% iron and having a thermal conductivity of substantially over 0.05. The resulting cushion coat is labeled in diagram d of FIG. 9.

* The specific powder used was another commercial product of Eutectic Corporation, having the Eutectic mark and identification "LUBRO-TEC 19985."

During the various coating steps, the temperature of the dryer drum was maintained in the neighborhood of about 200° F. to 210° F. Following the application of the cushion or intermediate coat, the hard primary coat was next applied using the same apparatus, wherein vessels 48 were all stocked with a hard-surface coating powder** containing 0.2 to 0.4% C, 3% max Fe, 6.5 to 9.5% Cr, 2.5% B, 3.0% Si and the balance essentially nickel, the same being sprayed in the course of three traverses to a thickness of about 0.073 inch; the resulting build-up is illustrated by diagram e of FIG. 9, and note also FIG. 2 which shows the primary coat 22 in bonding relationship with cushion coat 23 which in turn is bonded to the substrate, via a thin bond coat (not shown).

** The specific powder used was a third commercial product of Eutectic Corporation, having the Eutectic mark and identification "DUROTEC 19910."

The final step of precision-finishing the roll 10 is, as previously, a grinding step which may involve one or more traverses of rotated grinding-wheel means, suggested by diagram *f* of FIG. 9, it being understood that the grinding step is preferably performed after the steam flow has stopped and the drum has been allowed to return to substantially room temperature.

OTHER ILLUSTRATIVE EXAMPLES

Examples of other composite dryer-roll structures are shown in FIGS. 3 to 6 which are cross-sectional fragments of various other embodiments.

Figure 3:
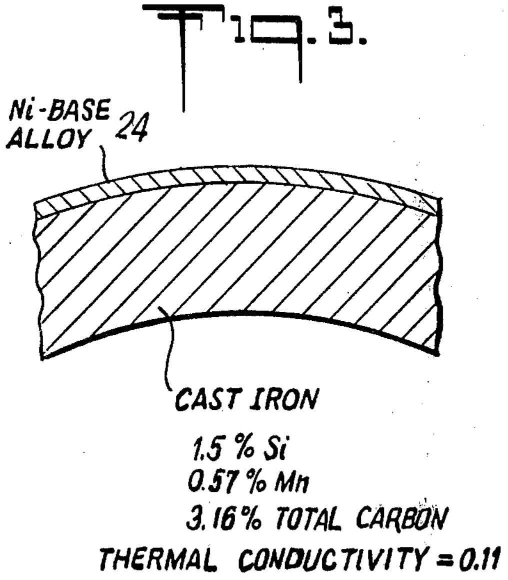
FIG. 3 is a fragment of a roll composite in cross section comprising a cast-iron substrate with a nickel-base alloy coating metallurgically bonded thereto.

In the case of FIG. 3, the nickel-base hardfacing alloy comprises about 1% Si, 2% B, 1% C, 15% Cr and the balance essentially nickel. The ferrous metal substrate is a cast-iron heat exchanger element containing 1.5% Si, 0.57% Mn, 3.16% total carbon and the balance iron, the substrate having a thermal conductivity of about 0.11. The surface of the element is cleaned in the usual manner followed by grit blasting with cast-iron grit or threading on a lathe; a bond coat is applied; and the primary alloy coating 24 is sprayed onto the surface to form a coating of about 0.05 inch thick, to provide a final coating which will exhibit a thermal conductivity of over 0.05.

Figure 4:
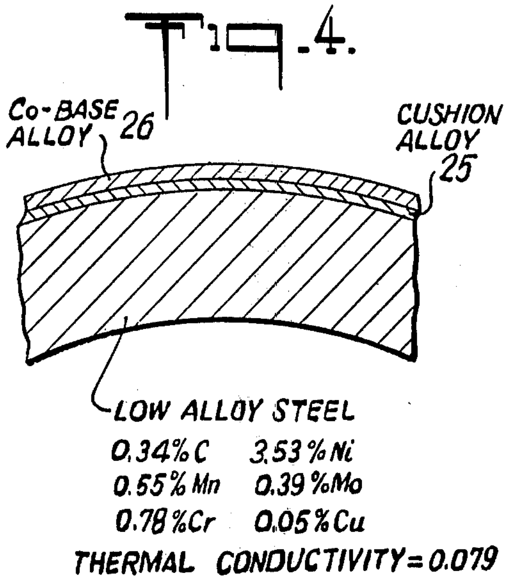
FIG. 4 is a fragmentary representation of a roll composite in cross section comprising a low alloy steel substrate having an intermediate cushion alloy with an outer coating of a cobalt-base heat resistant alloy metallurgically bonded thereto.

FIG. 4 is illustrative of another heat-exchanger element comprising low alloy steel substrate coated with a cobalt-base alloy containing 1% Si, 2% B, 3% C, 25% Cr, 3% Ni, 4.5% W, 3% Mo and the balance essentially cobalt. The low alloy steel substrate contains 0.35% C, 0.55 % Mn, 0.78% Cr, 3.53% Ni, 0.39% Mg, 0.05% Cu and the balance iron. This steel exhibits a thermal conductivity of about 0.079.

The ferrous metal drum is similarly prepared and a bond-coat layer applied, as in the above illustrative example, using the gravity-feed torches of FIG. 7. The bond coat powder comprises about 5% Al and 95% Ni, the aluminum particles being bonded to the core nickel powder with a phenolic resin, e.g., phenolformaldehyde. The thickness of the bond coat sprayed onto the surface is about 0.005 inch.

Following the application of the bond coat (note FIG. 2), a ductile cushion alloy is applied as in Example I to provide an intermediate layer 25 of about 0.03 inch thick and a cobalt-base hardfacing alloy then sprayed onto the metal substrate. The final coating 26 is characterized by a cobalt alloy matrix through which borides and carbides are dispersed, the amount of chromium remaining in solution with the cobalt being sufficiently below 10% or 5% by weight to assure optimum thermal conductivity of at least about 0.05.

Figure 5:
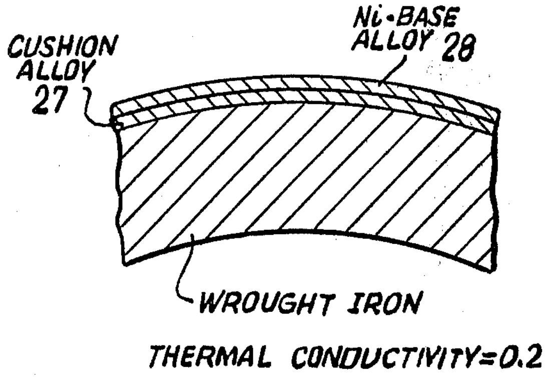
FIG. 5 is similar to FIG. 2, except that the metal substrate is wrought iron and the outer coating is a nickel-base alloy.

In FIG. 5, a wrought iron substrate is shown coated with a nickel-base hardfacing alloy, the substrate having a thermal conductivity of about 0.2. The nickel-base alloy coating comprises 3% Si, 2% B, 5% Cr, 5% Mo and the balance essentially nickel. The alloy is applied similarly as for the embodiment of FIG. 2, a bond coat being first applied, followed by a ductile steel cushion coat 27 of about 0.05 inch thick. The steel contains 0.12% C, 1% Mn+Si, 1% Cr, 0.5% Ni, 0.4% Cu and the balance iron.

The final nickel-base alloy coating 28 of thickness of about 0.05 inch will have the desired thermal conductivity by virtue of the formation of borides of the refractory solute metal chromium and molybdenum.

Figure 6:
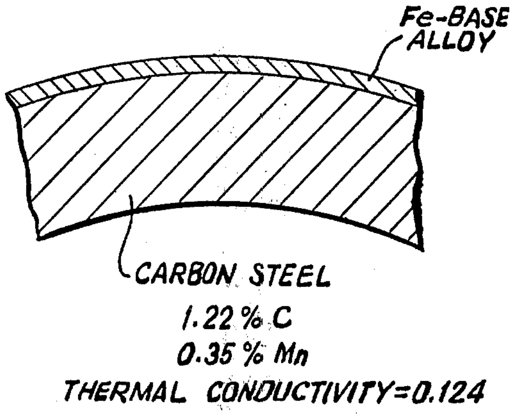
FIG. 6 shows a fragment of a carbon steel substrate with an iron-base alloy coating metallurgically bonded thereto in accordance with the invention.

FIG. 6 shows a composite in which the ferrous metal substrate is a carbon steel containing 1.22% C, 0.35% Mn and the balance iron, the steel substrate exhibiting a thermal conductivity of about 0.124. The iron-base hardfacing alloy coating contains about 3% Si, 2% B, 10% Cr, 5% Mo and the balance essentially iron. This coating is applied to the carbon steel substrate similarly as described for FIG. 1.

An important property of a coating is its resistance to flaking, spalling, etc. Thus, it is desirable that the relative coefficient of expansion between the final coating and the ferrous metal substrate should be within the range of plus 50% minus 30%. Assuming the ferrous metal substrate to have a coefficient of expansion referred to ambient temperature of about $11\times10^{-6}$ inch/inch/°C., the alloy coating may have a coefficient of expansion ranging from about 7.7 to about 16 or $17\times10^{-6}$ inch/inch/°C., so long as the alloy coating is preferably mechanically and metallurgically bonded to the ferrous metal substrate through a ductile nickel-base cushion alloy of the type referred to hereinabove or a steel coating containing at least 95% iron. The ductile nickel-base cushion alloy preferably has a composition ranging up to about 0.025 max carbon, 2% max Mn+Si, about 5% to 15% Fe, about 5% to 20% Cr and the balance essentially nickel, the thickness of the alloy being less than about 0.05 inch.

Summarizing the foregoing, the invention provides a machine and method for semi-automatically applying the various successive coatings deemed appropriate to the desired surface conditioning of a variety of rolls for various applications, including of course the specific Yankee-dryer application which is the focus of the present disclosure. The machine and method provide, as an article of manufacture, a composite ferrous metal dryer roll having a hard-facing coating mechanically and metallurgically bonded to the surface thereof characterized by adequate thermal conductivity relative to the ferrous metal surface of the roll.

As stated hereinbefore, the primary coating of the hardfacing alloy may be bonded either directly to the ferrous metal substrate or through the agency of an intermediate ductile cushion alloy, e.g., a ductile nickel-base alloy of thickness less than 0.05 inch or said steel cushion layer of thickness ranging from about 0.04 to 0.13 inch.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The method of using a gas torch in the spray-coating of a convex cylindrical metal workpiece surface, which comprises rotating the workpiece on a horizontal axis, orienting the torch for discharge generally horizontally and radially toward the cylindrical surface at a given longitudinal location and at a first general peripheral location, adding a flow of metal powder to the torch flow, whereby a coating of metal is locally deposited on the workpiece surface in the course of workpiece rotation, concurrently abrasively scouring the cylindrical surface at said longitudinal location and at a second general peripheral location angularly offset from the region of instantaneous torch discharge, the direction of workpiece rotation being such that the cylindrical surface moves downward past the region of torch discharge thereon, and horizontally traversing along the workpiece the longitudinal region of torch discharge and abrasive scouring, the effective longitudinal extent of the region of torch discharge and abrasive scouring being relatively great compared to the traverse advance per workpiece revolution, whereby multiple coats of sprayed metal are applied to the workpiece for a given traverse, and whereby in the course of said given traverse the abrasive scouring step is performed after application of each coat and before application of the next coat, to thereby remove metal powder which is not densely compacted and fused between coat applications so that more densely compacted sprayed metal will characterize the coat produced in the course of continuous rotation of the workpiece.

2. The method of claim 1, in which the abrasive scouring is by wire-brushing.

3. The method of claim 1, in which the gas torch is one of a plurality simultaneously directing their discharges at plural spaced locations along the workpiece, the collective span of all torch spacings being substantially less than the longitudinal extent of the workpiece, and wherein the abrasive-scouring step is applied along substantially the said collective span.

4. The method of conditioning the external convex cylindrical surface of a Yankee-dryer or the like roll, which comprises passing a flow of steam through the roll until achievement of a roll-surface temperature of at least substantially 200° F., rotating the roll on a horizontal axis, directing a flaming gas-torch flow generally horizontally and radially toward the cylindrical surface at a given longitudinal location at a first general peripheral location on the side for which said cylindrical surface is moving downwardly, supplying a flow of metal powder to the torch flow, whereby a coating of metal is locally deposited on the cylindrical surface in the course of roll rotation, concurrently abrasively scouring the cylindrical surface at said longitudinal location and at a second general peripheral location angularly offset from the region of instantaneous torch flow, and horizontally traversing along the cylindrical surface the longitudinal region of torch discharge and abrasive scouring, the effective longitudinal extent of the region of torch discharge and abrasive scouring being relatively great compared to the traverse advance per roll revolution, whereby multiple coats of sprayed metal are applied to the roll for a given traverse, and whereby in the course of said given traverse, the abrasive scouring step is performed after application of each coat and before application of the next coat, to thereby remove metal powder which is not densely compacted and fused between coat applications so that more densely compacted sprayed metal will characterize the coat produced in the course of continuous rotation of the roll.

5. The method of claim 4, in which the roll is preliminarily conditioned by turning a helical thread on the cylindrical surface.

6. The method of claim 4, in which the metal-powder flow comprises first a bond-coat powder flow for at least one full longitudinal traverse of the roll, then a ductile-cushion alloy powder flow for a plurality of longitudinal traverses of the roll, and thereafter a hard-coating alloy-powder flow for a plurality of longitudinal traverses of the roll.

7. The method of claim 4, in which the flaming gas-torch flow is one of a clustered longitudinally spaced plurality of such flows, the first such flow in the direction of traverse advance being a flaming torch flow without added metal-powder flow, whereby the metal-powder flow is applied only to surface regions which have been conditioned by flaming-gas discharge and abrasive scouring.

8. The method of claim 4, and including the step of cylindrical-surface grinding the coated roll to the extent of removing a portion only of the coating depth.

9. The method of claim 4, in which the metal-powder flow comprises first a bond-coat powder flow for at least one full longitudinal traverse of the roll, and thereafter a hard-coating alloy-powder flow for a plurality of longitudinal traverses of the roll.

10. The method of claim 9, in which the bond-coat powder flow includes an exothermically reactive component.

11. The method of claim 4, in which the region of abrasive scouring is beneath the region of instantaneous torch flow.

12. The method of using a gas torch in the spray-coating of a convex cylindrical metal workpiece surface, which comprises rotating the workpiece on a horizontal axis, orienting the torch for discharge generally radially toward the cylindrical surface at a given longitudinal location and at a first general peripheral location, adding a flow of metal powder to the torch flow, whereby a coating of metal is locally deposited on the workpiece surface in the course of workpiece rotation, concurrently abrasively scouring the cylindrical surface at said longitudinal location and at a second general peripheral location angularly offset from the region of instantaneous torch discharge, and horizontally traversing along the workpiece the longitudinal region of torch discharge and abrasive scouring, the effective longitudinal extent of the region of torch discharge and abrasive scouring being relatively great compared to the traverse advance per workpiece revolution, whereby multiple coats of sprayed metal are applied to the workpiece for a given traverse, and whereby in the course of said given traverse the abrasive scouring step is performed after application of each coat and before application of the next coat, to thereby remove metal powder which is not densely compacted and fused between coat applications so that more densely compacted sprayed metal will characterize the coat produced in the course of continuous rotation of the workpiece.

13. The method of conditioning the external convex cylindrical surface of a Yankee-dryer or the like roll, which comprises passing a flow of steam through the roll until achievement of a roll-surface temperature of at least substantially 200° F., rotating the roll on a horizontal axis, directing a flaming gas-torch flow from one side of and generally radially toward the cylindrical surface at a given longitudinal location and at a first general peripheral location, supplying a flow of metal powder to the torch flow, whereby a coating of metal is locally deposited on the cylindrical surface in the course of roll rotation, concurrently abrasively scouring the cylindrical surface at said longitudinal location and at a second general peripheral location angularly offset from the region of instantaneous torch flow, and horizontally traversing along the cylindrical surface the longitudinal region of torch discharge and abrasive scouring; the effective longitudinal extent of the region of torch discharge and abrasive scouring being relatively great compared to the traverse advance per roll revolution, whereby multiple coats of sprayed metal are applied to the roll for a given traverse, and whereby in the course of said given traverse the abrasive scouring step is performed after application of each coat and before application of the next coat, to thereby remove metal powder which is not densely compacted and fused between coat applications so that more densely compacted sprayed metal will characterize the coat produced in the course of continuous rotation of the roll.

* * * * *